United States Patent Office 3,793,435
Patented Feb. 19, 1974

3,793,435
SEPARATION OF HYDROGEN FROM OTHER GASES
James J. Reilly, Bellport, and Richard H. Wiswall, Jr., Brookhaven, N.Y., assignors to the United States of America as represented by the United States Atomic Energy Commission
No Drawing. Filed May 10, 1972, Ser. No. 251,874
Int. Cl. B01d 53/34; C01b 6/24
U.S. Cl. 423—248                     1 Claim

ABSTRACT OF THE DISCLOSURE

A method of absorbing hydrogen in the presence of $CO_2$, whereby an alloy of the approximate composition $LaNn_5$ is employed; and, in the presence of CO, copper replaces some of the nickel in such an alloy.

SOURCE OF THE INVENTION

The invention described herein was made in the course of, or under a contract with the U.S. Atomic Energy Commission.

BACKGROUND OF THE INVENTION

Hydrogen used as a fuel for portable fuel cell powerplant systems may be produced by the steam reforming of hydrocarbon fuel. In the resulting product the hydrogen is mixed with other products of the reaction including $O_2$, CO, and $CO_2$, plus any excess $H_2O$.

In order to use the hydrogen it is necessary to separate it from these other gaseous products. One method in current use for accomplishing this, involving selective diffusion through palladium-silver membranes, is very expensive. Other methods which can be used are also expensive or suffer other disadvantages.

It has been proposed to accomplish the separation of hydrogen from the other gaseous products of the reaction mentioned above by resorting to a selective absorption such as that described in U.S. Pat. No. 3,438,178. Under consideration have been also the absorption of hydrogen processes described in our U.S. Pats. 3,508,414, 3,375,676 and 3,315,479.

It has been found, in attempting to utilize the known hydrogen absorption processes, that presence of even small amounts of $O_2$, CO, and $CO_2$ causes a sharp decrease in the efficiency and the effectiveness of the hydrogen absorption. CO is readily removable by conversion to $CO_2$ or $CH_4$ by known simple procedures, but the presence of $CO_2$, sometimes in large amounts of 25% or more, represents a substantial impediment. Since these are the very products mixed with the hydrogen resulting from the reforming of the hydrocarbons described above, it is readily apparent that the earlier processes are not capable of providing the selective absorption of hydrogen in the presence of the other reaction products, especially $CO_2$, from the hydrocarbon fuels.

SUMMARY OF THE INVENTION

In accordance with the principles of this invention it has been found that hydrogen will be selectively absorbed from a gas containing at least one other gaseous product, especially $CO_2$ in substantial amounts, by contacting the gas with a distributed form of an alloy of the rare earth lanthanum (La) and nickel in an active state. A metal hydride is formed in which the rare earth-nickel alloy is hydrided. While La has been found to be most successfully employed in this way, the other rare earths praseodymium (Pr) and cerium (Ce) give indications of being similarly useful. In another embodiment, where CO is present in significant amounts, the inhibiting effect of this gas is overcome by replacing some of the nickel present in the alloy with copper.

It is thus a principal object of this invention to provide a method for selectively absorbing hydrogen from a gaseous mixture containing at least one other gas.

Other objects and advantages of this invention will hereinafter become obvious from the following description of preferred embodiments of this invention.

DESCRIPTION OF THE PREFERRED EMBODIMENTS

In a preferred embodiment of this invention, an ingot of $LaNi_5$ is first made active by heating in a sealed, evacuated reactor vessel for outgassing and then, at room temperature and at a pressure of 200 p.s.i.a., contacted with $H_2$. The ingot which disintegrates upon being hydride is subsequently heated to 100–200° C. to drive off the $N_2$. The $LaNi_5$ is then in an active state, useful to carry out the purposes of this invention. By active state is meant herein capable of absorbing hydrogen quickly.

A gas mixture consisting of $H_2$ and other gases including $CO_2$ and water vapor is then passed into the bed of active $LaNi_5$ at a pressure of at least 100 p.s.i.a. at room temperature. After a short period of time the alloy becomes hydrided, forming $LaNi_5H_x$, where $x$ has been found to be any number up to 7. This hydride readily gives up its $H_2$ at room temperature when the pressure is lowered at about 25 p.s.i.a. The hydrogen so evolved can be used where necessary or desired.

One of the distinct advantages of the method described is that the alloy will function effectively in the presence of large amounts of $CO_2$, typically about 25% by volume, while even up to 90% has been shown not to significantly interfere with the absorption process, a result not successfully accomplished up to now, provided CO content of the gas is less than 0.05% by volume.

In the event that some CO is present in the amount of at least 0.05% by volume but not more than 1%, a modified alloy where copper replaces some but not all of the nickel is employed successfully. It has been found that CO present in very small amounts has a very inhibiting effect on $H_2$ absorption. While CO is ordinarily easy and inexpensive to remove, either by forming $CO_2$ or by methanation (catalytic hydrogenation), where only a small trace is present, of the order indicated, it is possible in accordance with the principles of this invention simply to effectively neutralize the inhibiting effect of the CO by replacing some of the nickel in the alloy with copper. The alloy in this case would be $LaNi_yCu_{5-y}$, where $y$ would be any number from 1 to 4. (In the case where $y=5$, then we would have the limiting case, previously described, $LaNi_5$.)

With some CO present up to a maximum of 1% by volume, the alloy $LaNi_yCu_{5-y}$, where $y$ is any number 1–4, following the activating process previously described for $LaNi_5$, absorbs the hydrogen with almost the same efficiency provided absorption is carried out at a temperature of at least 100° C. and a pressure of at least 300 p.s.i.a.

Preliminary tests with the rare earths praseodymium (Pr) and cerium (Ce) indicate that a similar result can be obtained if Pr is substituted for La, and if Ce is used in combination with La. Investigations with other materials instead of copper indicate that cobalt and iron may each function in a similar fashion and have certain advantages in particular situations.

The following illustrate this invention.

EXAMPLE 1

A mixture of gases was prepared simulating that which would be produced from reformation of a hydrocarbon incorporating a CO shift reactor and a methanation stage which would reduce the CO content to about 22 p.p.m. on a dry basis. The composition of the gaseous mixture upon analysis was 79.3% $H_2$, 0.36% $CH_4$, 70 p.p.m. $N_2$, and 20 p.p.m. CO. In a stainless steel tube of ⅜ in. diameter, a bed of active $LaNi_5$ 22.5 in. in length was prepared by successive hydriding and dehydriding. The bed contained 441.1 g. of $LaNi_5$ powder (sieve size −25, +100). The bed contained some inert high porosity packing to prevent agglomeration. The gaseous mixture was passed up through the bed at room temperature at an inlet pressure of 175 p.s.i.a., at an average flow rate of 250 ml. (STP)/min. The effluent gas, at an outlet pressure of 116–133 p.s.i.a. was subjected to analysis in a gas chromatograph, where it was found that between about 100 seconds and a little over 2500 seconds the $H_2$ content of the effluent rose linearly from about 15% $H_2$ to about 80% $H_2$. This indicated that the bed functioned rapidly to remove the $H_2$ and as the bed approached saturation the bed lost effectiveness. At this point the reformer gas feed to the column was shut off and the column was vented to the atmosphere. The effluent gas was analyzed for hydrogen and $CO_2$ by a gas chromatograph. A total of 6500 ml. (STP) of gas was evolved from the column; the first 1000 ml. contained a maximum of 8 vol. percent $CO_2$ in hydrogen; the $CO_2$ was primarily due to the holdup of reformer gas in the void space of the column. The remaining 5500 ml. was hydrogen, having purity greater than 99.5%.

EXAMPLE 2

In two runs similar to that of the preceding example, the alloy $LaCu_4Ni$ was employed as the bed material with gases containing 0.5 mol percent and 1.0 mol percent CO, respectively, at temperatures within the range 124–150° C. and pressures in the range 450–475 p.s.i.a. In the two runs the hydrides formed had the compositions $$LaCu_4NiH_{3.6}$$

and $LaCu_4NiH_{3.0}$ respectively. These results indicate the effectiveness of the lanthanum, copper, nickel alloy in absorbing hydrogen in the presence of CO.

Summing the advantages and results of this invention, the rare earth nickel compound when used according to the principles of the invention is capable of absorbing hydrogen effectively in the presence of substantial amounts of $CO_2$, and with the substitution of copper for some of the nickel, will function effectively in the presence of CO.

What is claimed is:

1. A process for separating hydrogen from a gaseous mixture which includes CO of at least about 0.05% by volume comprising exposing said gas mixture at a temperature of at least 100° C. and a pressure of at least 300 p.s.i.a. to an active form of the alloy $LaNi_yCu_{5-y}$, where $y$ is any number from one to four, to form a metal hydride $LaNi_yCu_{5-y}H_z$, where $z$ is in excess of one.

References Cited

UNITED STATES PATENTS

| 3,320,422 | 5/1967 | St. John | 423—645 X |
| 3,382,106 | 5/1968 | Jung et al. | 423—645 X |

EARL C. THOMAS, Primary Examiner

U.S. Cl. X.R.

252—181.6; 423—263, 644